United States Patent [19]

Powell, Jr.

[11] Patent Number: 4,673,513

[45] Date of Patent: Jun. 16, 1987

[54] PROCESS FOR CHLORINATION OF SWIMMING POOLS

[76] Inventor: Jonathan S. Powell, Jr., 5094 Tip Top Rd., Mariposa, Calif. 95338

[21] Appl. No.: 881,457

[22] Filed: Jul. 2, 1986

[51] Int. Cl.$^4$ ............................ C02F 1/76; E04H 3/20
[52] U.S. Cl. .................................... 210/756; 210/765; 210/739; 210/169
[58] Field of Search ............... 210/754, 755, 756, 765, 210/169, 139

[56] References Cited

U.S. PATENT DOCUMENTS

| | | | |
|---|---|---|---|
| 3,123,554 | 3/1964 | Murray | 210/756 |
| 4,115,263 | 9/1978 | James | 210/756 |
| 4,363,728 | 12/1982 | Guglielmi et al. | 210/169 |
| 4,389,318 | 6/1983 | Wojtowicz | 210/755 |
| 4,614,595 | 9/1986 | Azzarella et al. | 210/765 |

Primary Examiner—Richard V. Fisher
Assistant Examiner—Richard D. Jordan
Attorney, Agent, or Firm—Duane C. Bowen

[57] ABSTRACT

Adjustment of chlorine and pH levels in swimming pool water by, (a) treating the water with material selected from the group consisting of cyanuric acid, ammelide and their salts, (b) adding material adjusting the chlorine and acid levels of the water if it has a pH above about 7.5 and adding sodium hypochlorite if the water has a pH about 7.5 or lower, (c) a set number of days later, such as a week, with automatic equipment, without taking a reading of water conditions, adding sodium hypochlorite to the water in a predetermined amount, and (d) continuing the process indefinitely by alternating steps (b) and (c) at intervals of the set number of days. The automatic equipment including a vessel containing sodium hypochlorite solution, a pool water recirculation line including a recirculation pump, and a feeder line from the vessel to the recirculation line. A valve acting on the feeder line to control discharge from the vessel including a pair of valve discs, one stationary and the other rotated through gearing by a standard, commercially available battery powered clock motor. The valve discs having passageways and ports in abutting faces that only communicate to permit discharge through the feeder line in selected clocked positions of the rotating valve discs.

5 Claims, 9 Drawing Figures

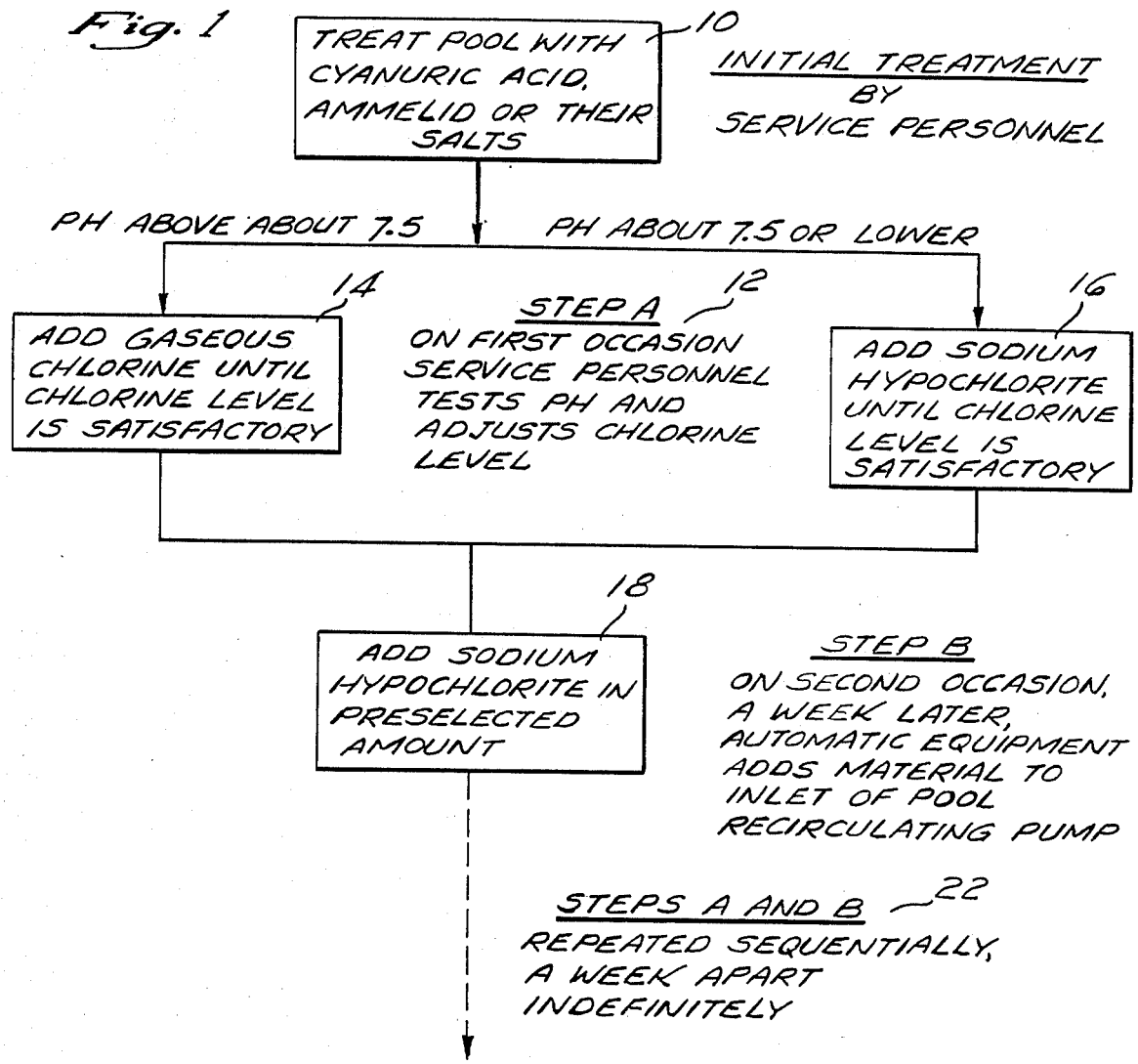
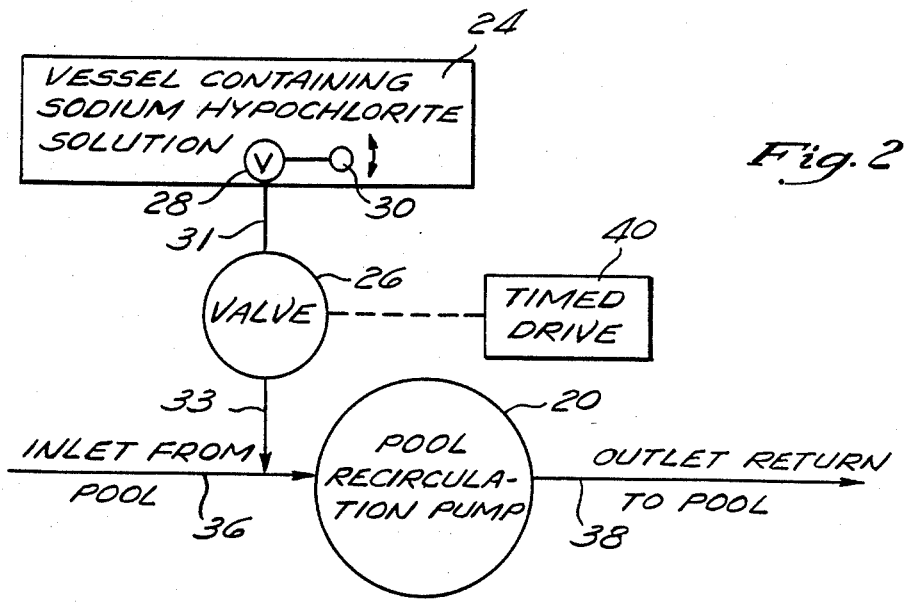

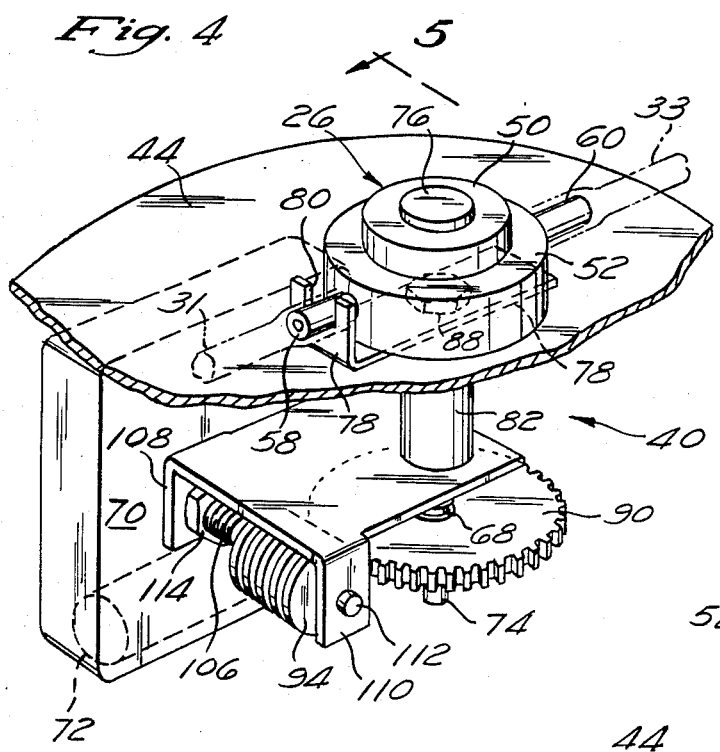

PROCESS FOR CHLORINATION OF SWIMMING POOLS

BRIEF SUMMARY OF THE INVENTION, BACKGROUND AND OBJECTIVES

My invention relates to a means and process for chlorination of swimming pools using elemental chlorine, cyanuric acid, and sodium hypochlorite.

I became involved in the conception, development and commercialization of the process and equipment for chlorinating swimming pools using a combination of gaseous chlorine or sodium hypochlorite and a compound selected from the group consisting of cyanuric acid, ammelide, and their salts. (For convenience in the following specification, I will usually use the expression "cyanuric acid" rather than also listing the other members of the group.)

The cyanuric acid and chlorine combine to prevent rapid hydrolysis of the chlorine by sunlight thus requiring less chlorine for swimming pool treatment. Free chlorine in an equilibrium is liberated from the combination as needed to sanitize the pool water. This method was developed and commercialization started in the 1959–1961 period and became known as the Poolchlor System. U.S. Pat. No. 2,988,471, assigned to Food Machinery Corporation, was granted June 13, 1961, and was entitled "Stabilization of Active Chlorine Containing Solutions" and concerned the use of cyanuric acid in treating swimming pools.

When chlorine ($Cl_2$) is injected in pool water, one atom of chlorine with a valence of plus one combines with the cyanuric acid and the other chlorine atom with a valence of minus one forms hydrochloric acid. This hydrochloric acid needs to be neutralized to maintain the pH in the desired range of 7.2 to 8.2. The pool makeup water may contain some alkalinity to help in this neutralization. Some alkalyzer, such as sodium carbonate, frequently has to be added to help neutralize the hydrochloric acid.

The object of my invention includes devising a means and process using a combination of chlorine gas and sodium hypochlorite solution, at different times, to recharge the cyanuric acid when pool water becomes depleted with respect to $Cl^+$. When chlorine gas is used, some hydrochloric acid is formed which takes care of any excess alkalinity introduced by the makeup water. When no acid is required, sodium hypochlorite (which has a neutral effect) is added to add the $Cl^+$ to the cyanuric acid in the pool water. By the proper use of chlorine gas and sodium hypochlorite no additional alkalizer need be added to the pool water, which in the original Poolchlor System causes the problem of the precipitation of calcium carbonate from the pool water. The use of sodium hypochlorite solution according to my means and process lends itself to automatic injection as described in the attached description which is a part of this invention. It is a further objective of my invention to devise a semi-automatic means and process in adding chlorine to pool water (treated by cyanuric acid) so that service personnel need perform pool service less frequently, i.e., biweekly instead of weekly.

Another objective of my invention is to devise economical, reliable equipment to periodically add sodium hypochlorite to the inlet side of a swimming pool recirculating pump. More specifically, it is an objective to devise valve and timing means powered by a battery, especially a small battery or energizer such as a "C" battery size, to control when a vessel containing sodium hypochlorite is connected to the suction side of a pool recirculating pump.

My invention will be best understood, together with additional advantages and objectives thereof, when read with reference to the drawings.

THE DRAWINGS

FIG. 1 is a flow diagram showing a specific embodiment of my process for chlorination of a swimming pool.

FIG. 2 is a schematical view of equipment for automatically adding sodium hypochlorite to a pool.

FIG. 3 is a perspective view of a valve installation used to automatically control addition of sodium hypochlorite.

FIG. 4 is an enlarged fragmentary perspective view of operating valve parts.

FIG. 5 is an elevated view, partly in section, taken on line 5—5 of FIG. 4.

FIG. 6 is an exploded perspective view of upper and lower valve discs.

FIG. 7 is a perspective view of the upper valve disc in inverted position showing valve grooves.

FIG. 8 is a schematical view of the valve discs indicating how the grooves and porting of upper and lower valve discs mate.

FIG. 9 is an elevated view, partly in section, of the valve discs.

THE PROCESS

FIG. 1 diagrams the process, which includes:

The step 10 of initially having service personnel treat the swimming pool with cyanuric acid.

Step A The step 12, on a first occasion, of having service personnel test the pH of the pool and adjusting the chlorine level
  1. by the step 14 of adding gaseous chlorine if the pH is above about 7.5, or
  2. by the step 16 of adding sodium hypochlorite if the pH is about 7.5 or lower Step B The step 18, a second occasion, a week later, of adding sodium hypochlorite in preselected amount, by use of automatic equipment adding the material to the inlet of the pool recirculating pump 20.

Thereafter, the step 22 of alternating steps A and B indefinitely.

I will now review the process in more detail.

The quantities mentioned herein are optimum. Other quantities than those cited could be used to carry out the process, but the treatment would suffer in quality and/or would be less economical.

The quantities of chlorine, sodium hypochlorite, and cyanuric acid used are based on a standard-sized swimming pool containing 20,000 gallons of water. For pools containing more or less water than this, the quantities of chemicals used would change generally proportionately. One pound of one of the chemicals added to the standard-sized pool gives a concentration of 6 ppm "by weight".

Initially, step 10, cyanuric acid or its sodium salt (making allowance for the sodium content) is added to the swimming pool to give a concentration of 100 ppm and the level maintained thereafter between 75 and 100 ppm. Cyanuric acid is not consumed in the process but can be lost when water is removed from the pool by splashing, a leak in the pool, backwashing the filter, etc.

Some cyanuric acid may be lost by combining with foreign materials in the pool water to form insoluble compounds that are filtered out of the water. Some cyanuric acid may be lost by absorption by filtering materials such as diatomaceous earth. The average loss of cyanuric acid for a standard pool is about 12 lbs. per year so a makeup of about 12 lbs. of cyanuric acid per year is required after the initial addition.

To maintain the cyanuric acid level within the range of 75 to 100 ppm, the water is tested periodically for cyanuric acid using the standard melamine test. Pool water and melamine solution added together in the test proportions gives a turbid solution. A measure visually of the opaqueness of this solution is related to the cyanuric acid concentration. When the cyanuric acid concentration reduces to about 75 ppm, cyanuric acid is added in an amount to increase the concentration to about 100 ppm. The test for cyanuric acid can be made with a test kit called The Aquality turbidity test set made by Aquality, Inc., 8938 Mason Ave., Chatsworth, Calif. 91311.

Chlorine is added to sanitize the swimming pool water to give an initial level of preferably 8 ppm. This chlorine may be added by dissolving in the water of the standard pool 1⅛ lbs. of gaseous chlorine or by adding 1⅛ gals. of sodium hypochlorite solution containing the equivalent of one pound of chlorine per gal.

In sanitizing the pool, pH should be maintained between 7.2 and 8.2. The test for pH is the standard test using phenol red indicator and comparing the color formed with a pool water sample with that of the color standards in the test kit. To sanitize, in adjusting the chlorine level preferably to 8 ppm in Step A (FIG. 1), if the pH is above 7.5, chlorine gas is dissolved in the pool water to increase the chlorine level to 8 ppm. If the pH is 7.5 or lower, sodium hypochlorite solution is added in Step A to increase the chlorine level to preferably 8 ppm. When chlorine gas is added, it forms a little over ½ lb. of HCL as hydrochloric acid for each lb. of chlorine gas dissolved. This lowers the pH by neutralizing the alkalinity introduced by the pool makeup water. When sodium hypochlorite is added, it is essentially neutral adding possibly only a small amount of alkalinity to raise the pH some.

The chlorine in the pool water will last about a week from about the middle of June until about the middle of September in climates having warm to hot summer temperatures. From the middle of September until the middle of June in climates having cool to cold temperatures, the chlorine in the pool water will last two weeks or longer. For convenience, in the FIG. 1 flow chart, for steps 18 and 20, the summer or warm cycle is used, as well as in the specification, but this is to be interpreted as meaning the needed interval whether one week, two weeks, etc. It is usually convenient in commercial practice, to use even one or two week intervals but a ten-day interval, etc. always would be possible. With a five or six day work week, it is convenient to schedule a pool to be serviced always on Monday or Tuesday or Wednesday, etc. At the end of these periods of time a service person must visit the pool and add more chlorine. He will first test the pool water for its residual total chlorine content using an ortho toluidine solution. A standard test kit, such as the Taylor kit, is used (gives both free chlorine and that combined with the cyanuric acid). However, the Taylor kit is designed for low concentrations of chlorine up to about one ppm so only 1/10 the amount of pool water sample is put in the test cell and proportionately diluted ortho toluidine solution is used to fill the cell. The yellow color developed is compared visually in color density to the color standards of the kit for different chlorine concentrations. The concentration of chlorine for the standard that matches the closest is multiplied by 10 for the actual total chlorine concentration in the pool water. The difference between this value and 8 is the ppm of chlorine the pool water needs to be increased. For a standard pool 1/6 of pound of gaseous chlorine or 1/6 of a gal. of sodium hypochlorite is added per ppm of chlorine increase required.

The pH of the pool water, as mentioned above, determines which source of chlorine is used. Since in the summer time a swimming pool needs to be visited twice as frequently as during the rest of the year, double the number of service personnel, trucks, and other equipment is required in the summer which increases the cost of servicing swimming pools during this period between 20 and 30%. The increased frequency of visits by service people also requires hiring and training part-time personnel who are less skilled and give poorer quality of service than regular employees. If servicing of pools could be done regularly on a two weeks schedule year around, the cost savings would be considerable plus the quality of service would be better by having full-time experienced employees. Therefore an important part of the swimming Pool treatment method described above is to have the step 18 or B of using an automatic sodium hypochlorite feeder, used at least during the summer season, which will inject into the swimming pool water circulating system a quantity of sodium hypochlorite solution, one week after the service man's visit, sufficient to raise the chlorine level to 8 ppm.

Then the step A—step B cycle 22 is followed in which the following week the service man would return and add chlorine gas or sodium hypochlorite solution depending on the pH to raise the chlorine level to 8 ppm. At this time he also would charge the sodium hypochlorite feeder vessel 24 with a quantity of sodium hypochlorite solution to give the same amount of chlorine that he had then added to raise the chlorine level to 8 ppm which would be injected at the end of the following week. The service person would repeat this procedure on each of his biweekly visits.

One design of a feeder is a rotational valve 26 made to rotate one rotation in 28 days by a clock movement (preferably battery powered). Every two weeks an inlet port 27 communicates with a discharge port 29 in valve 26. A tube 31 is connected between the inlet port 27 and valve 28 with a shut-off float 30 in the bottom of container 24 for sodium hypochlorite solution. The discharge port 29 is connected by a tube 33 to a tap on the inlet to the pool's circulating filter pump 20. The rotational valve's inlet port 27 is open to the discharge port 29 long enough to allow all of the sodium hypochlorite solution in container 24 to be sucked into the pool's circulating pump 20 and discharged into the pool. The float valve 28 shuts off when container 24 is empty to prevent air from being sucked into the pool's water circulating system.

It is conventional for swimming pools to be treated with gaseous chlorine and cyanuric acid or with sodium hypochlorite solution and cyanuric acid. In the former method because more hydrochloric acid is produced than is necessary to neutralize the alkalinity of the pool's makeup water, some alkalizer such as sodium carbonate has to be added periodically to keep the pH from going too low. In the latter method the pH of the pool water gradually becomes too high and hydrochloric acid has to be added periodically to lower the pH. In my system the two methods are combined and eliminate the need to add alkalizers or hydrochloric acid. Because sodium hypochlorite solution lends itself to being injected automatically, the two methods (addition of gaseous chlorine and additional of sodium hypochlorite) can be combined in a manner lowering labor and equipment costs.

The test kits for testing for pH using phenol red indicator and for chlorine using ortho toluidine indicator are combined in one kit called "The Taylor Midget Tester Model A". It is made by the Taylor Chemical Co., Inc., 7300 York Road, Baltimore, Md. 21204.

The time may come when gaseous chlorine may not be generally available. In such case, instead of adding gaseous chlorine in step 14, for a pH above about 7.5, sodium hypochlorite could be used plus sufficient hydrochloric acid to adjust the pH to between 7.5 and 8.2.

The lower desirable limit in pool pH is 7.2 because below that level corrosion could occur in metal piping, etc. The upper desirable limit in pool pH is 8.2, not because a higher level is damaging but because at a higher level the chlorine would be less effective in killing algae.

The Equipment

A suitable container or vessel 24 is provided for the sodium hypochlorite solution. Gravity feed from vessel 24 is suitable and preferable although pump 20 will also act by vacuum to suck liquid from vessel 24. Valve 28 shuts off line 31 when vessel 24 empties, by action of float 30, to avoid sucking air into pump 20.

FIG. 2 shows that line 33 connects to an inlet line 36 from the pool to pump 20, such as by use of a tee. Pump 20 can be a standard pool recirculating pump drawing water through line 36 from the pool and discharging water back to the pool through line 38. Water may be filtered and/or heated while it is being recirculated. Valve 26 is periodically opened by timed drive 40. A housing 42 provides a protective container for timed drive 40. Valve 26 is mounted on the lid 44 of housing 42. Housing 42 and lid 44 may be formed of metal or plastic but a metal lid is preferred as a solid mounting for valve 26 and drive 40.

Valve 26 includes an upper rotating disc 50 and a lower stationary disc 52. Disc 52 has vertical bores 27 and 29 that form inlet and outlet ports. Bores 27, 29 intersect larger horizontal bores 54, 56 in which are bonded stub tubes 58, 60 to which lines 31, 33 are secured by stretching the tubes forming lines 31, 33 over tubes 58, 60.

Upper valve disc 50 has an annular groove 62 and has two groove branches 64, 66. Annular groove 62 is of lesser radius than the distance from the center of valve disc 52 to one or both ports 27, 29 so that annular groove 62 communicates between ports 27, 29 in the area of abutment of the faces of discs 50, 52 only when groove branches 64, 66 are aligned with ports 27, 29, which will happen twice in each rotation of valve disc 50. This means that if valve disc is powered and timed to make a complete rotation in twenty-eight days, then ports 27, 29 will be joined by grooves 62, 64, 66 every fourteen days. In the configuration shown in the drawings (especially FIG. 8), port 27 is shown as always communicating with groove 62 whereas port 29 only communicates with branch grooves 64, 66, but the action would be the same if port 27 were the same distance from the center of disc 52 as port 29 and if port 27 only communicated with branch grooves 64, 66.

One reason port 27 is shown as always communicating with annular groove 62 is to illustrate how the discharge cycle can be varied depending on the location of one or more branch grooves 64, 66. For example, if only one branch groove 64, 66 were used, the discharge cycle would be twenty-eight days. If four branch grooves 64, 66 were used (ninety degrees apart), discharge would occur weekly (presuming, of course, that timed drive 40 rotates upper disc 50 a complete revolution every twenty-eight days).

Discs 50, 52 are preferably formed of Teflon, for several reasons: (a) The adjacent flat faces of discs 50, 52 can be pressed together by means of a spring 68 to form a seal but Teflon has such good antifrictional properties that the seal can be provided at an acceptable level of friction (to be overcome by a clock movement 70 powered by a size AA, 1.5 volt battery 72), and (b) the Teflon discs will withstand the environment of use, i.e., ultraviolet radiation, corrosive atmosphere, temperature changes, etc.

Discs 50, 52 are mounted on a vertical shaft 74 with a head 76 acting as a top retainer for the assembly against which spring 68 can act. The opening in upper disc 50 through which shaft 74 extends is a tight fit, which means the clocked position of disc 50 shaft 74 can be changed with suitable torque. On the other hand, the opening in lower disc 52 through which shaft 74 extends is a loose fit so that there is free relative movement therebetween. Lower disc 52 is held stationary against rotation by an L-shaped member 78 having a bifurcated end 80 engaging one of the stub tubes 58, 60.

The support for shaft 74 and clock movement 70 includes a tubular member 82 having a bracket 84 secured to its lower end and having a reduced diameter threaded upper portion 86 extending through an opening in lid 44 and an opening in L-shaped member 78. A nut 88 on threaded portion 86 secures L-shaped member 78 and lid 44 to tubular member 82.

A spur gear 90 is secured to the lower end of shaft 74 by a set screw 92. Spring 68 is positioned between gear 90 and bracket 84 to tension the assembly on shaft 74 including pressing together the flat adjacent faces of discs 50, 52. A helical gear 94 engages spur gear 90 to rotate the same.

Clock movement 70 is a standard purchased item. Such clock movements are available to be used by clock manufacturers to power wall or other clocks by batteries. The clock movmement used in the prototype of my equipment is powered by an AA-size battery 72, as stated before. Some clock movements have hour, minute and second outputs (in concentric tubes and spindle) but the clock movement 70 I use has only an hour and a minute output in concentric tube and spindle 100, 102 and I only connect the hour tube output to helical gear 94 to drive gears 94, 90. Hour tube 100 is secured in a bore 104 in helical gear 94. Minute spindle 102 rotates freely (without function) in bore 104. A threaded support tube 106 (part of clock movement 70 to mount the movement in various clocks) houses hour tube 100. Bracket 84 has two depending flanges 108, 110. An opening in flange 110 receives a stub shaft 112 on helical gear 94 and an opening in flange 108 receives support tube 106. A nut 114 on support tube 106 secures flange 108 to the housing of clock movement 70.

Clock movement 70 has quartz type action. The clock movement used in the prototype was manufactured by the Japanese firm of Tochigi Tokei Co., Ltd.

The gears 94, 90 are designed to rotate upper disc 50 once every twenty-eight days responsive to two complete rotations of hour tube 100 every twenty-four hours. If upper disc 50 rotates once every twenty-eight days, inlet port 27 and outlet port 29 communicate for discharge of sodium hypochlorite from vessel 24 every fourteen days when port 29 becomes aligned with one of the branch grooves 64 or 66.

One of the features of my invention is the economy of the equipment used, which is an important consideration in view of the need for a vessel 24, a valve 24, a timed drive 40, etc., for each swimming pool served. For example of costs, clock movement 70 in sizable quantities can be purchased for a price in the three to four dollar range, batteries 72 only need to be changed once a year and therefore involve nominal cost, the cost of electrical connection to household electricity is avoided, etc.

Having thus described my invention, I do not wish to be understood as limiting myself for the exact construction shown and described. Instead, I wish to cover those modifications of my invention that will occur to those skilled in the art upon learning of my invention and which are within the proper scope thereof.

I claim:

1. The process of adjusting chlorine and pH levels in the water of a swimming pool having a recirculating water line including a pump, comprising:
   (a) treating the water with material selected from the group consisting of cyanuric acid, ammelide and their salts in an amount effective to stabilize sanitizing active chlorine in aqueous solution against decomposition by ultraviolet light,
   (b) subsequently, on a first occasion, adding gaseous chlorine if the water has a pH above about 7.5 and adding sodium hypochlorite if the water has a pH about 7.5 or lower, in an amount determined by a reading of the existing level of chlorine in the water so that the level of chlorine is sufficient to sanitize the water,
   (c) a set number of days later, with automatic equipment, without taking a reading of water conditions, adding sodium hypochlorite to the water in a predetermined amount by introducing the sodium hypochlorite to said recirculating water line so that the level of chlorine in the water is sufficient to sanitize the water, and (d) continuing the process indefinitely by alternating steps (b) and (c) at intervals of said set number of days.

2. The process of claim 1 in which the steps (b) and (c) are alternated at intervals of one week.

3. In the process of claim 1, powering said automatic equipment with the hour dutput of a standard, commercially available clock motor.

4. The process of adjusting chlorine and pH levels in the water of a swimming pool, comprising:
   (a) treating the water with material selected from the group consisting of cyanuric acid, ammelide and their salts in an amount effective to stabilize sanitizing active chlorine in aqueous solution against decomposition by ultraviolet light,
   (b) subsequently, on a first occasion, adding material adjusting the chlorine and acid levels of the water if the water has a pH above about 7.5 and adding sodium hypochlorite if the water has a pH about 7.5 or lower, in an amount determined by a reading of the pH and of the existing level of chlorine in the water so that the level of chlorine is sufficient to sanitize the water,
   (c) a set number of days later, with battery powered automatic equipment, without taking a reading of water conditions, adding sodium hypochlorite to the water in a predetermined amount so that the level of chlorine in the water is sufficient to sanitize the water, and (d) continuing the process indefinitely by alternating steps (b) and (c) at intervals of said set number of days.

5. The process of claim 4 in which the steps (b) and (c) are alternated at intervals of one week.

* * * * *